US006495750B1

(12) United States Patent
Dinwoodie

(10) Patent No.: US 6,495,750 B1
(45) Date of Patent: *Dec. 17, 2002

(54) STABILIZED PV SYSTEM

(75) Inventor: Thomas L. Dinwoodie, Piedmont, CA (US)

(73) Assignee: PowerLight Corporation, Berkeley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/902,464

(22) Filed: Jul. 10, 2001

(51) Int. Cl.[7] .............................. H01L 31/048
(52) U.S. Cl. ................ 136/251; 136/244; 136/291; 52/173.3; 257/433
(58) Field of Search ................. 136/244, 251, 136/291; 52/173.3; 257/433

(56) References Cited

U.S. PATENT DOCUMENTS

| 4,233,085 A | * | 11/1980 | Roderick et al. ............ 136/244 |
| 4,677,248 A | * | 6/1987 | Lacey ......................... 136/244 |
| 5,316,592 A | | 5/1994 | Dinwoodie |
| 5,505,788 A | | 4/1996 | Dinwoodie |
| 5,524,401 A | * | 6/1996 | Ishikawa et al. ........... 52/173.3 |
| 5,647,915 A | | 7/1997 | Zukerman |
| 5,746,839 A | | 5/1998 | Dinwoodie |
| 6,061,978 A | | 5/2000 | Dinwoodie et al. |
| 6,148,570 A | | 11/2000 | Dinwoodie et al. |

FOREIGN PATENT DOCUMENTS

DE          3611542 A1      4/1986
JP          3-200376 A      9/1991
JP          9-148612 A  *   6/1997

OTHER PUBLICATIONS

Mr. Dan Shugar, P.E., "PowerLight to Install Solar Electric Roof Tile Manufacturing Facility with NYSERDA Cost –Sharing," Press Release, Mar. 21, 1997, PowerLight Corporation, Berkeley, CA, USA.

Daniel S. Shugar, P.E., "PowerLight Completes 50 kW of PV Systems in Wyoming," Press Release, Oct. 10, 1996, PowerLight Corporation, Berkeley, CA, USA.

Daniel S. Shugar, P.E. and Thomas L. Dinwoodie, AIA, "Photovoltaic Roof Tiles for Commercial Buildings," Solar Today Magazine, Jul./Aug. 1996, pp 18–20, Boulder, CO, USA.

* cited by examiner

Primary Examiner—Alan Diamond
(74) Attorney, Agent, or Firm—James F. Hann; Haynes Beffel & Wolfeld LLP

(57) ABSTRACT

A stabilized PV system comprises an array of photovoltaic (PV) assemblies mounted to a support surface. Each PV assembly comprises a PV module and a support assembly securing the PV module to a position overlying the support surface. The array of modules is circumscribed by a continuous, belt-like perimeter assembly. Cross strapping, extending above, below or through the array, or some combination of above, below and through the array, secures a first position along the perimeter assembly to at least a second position along the perimeter assembly thereby stabilizing the array against wind uplift forces. The first and second positions may be on opposite sides on the array.

7 Claims, 13 Drawing Sheets

STABILIZED PV SYSTEM

The U.S. Government has a paid-up license in this invention and the right in limited circumstances to require the patent owner to license others on reasonable terms as provided for by the terms of PVMat Subcontract ZAX-8-17647-12 awarded by the Department of Energy.

BACKGROUND OF THE INVENTION

Air moving across an array of photovoltaic (PV) assemblies mounted to the roof of a building, or other support surface, creates wind uplift forces on the PV assemblies. Much work has been done in the design and evaluation of arrays of PV assemblies to minimize wind uplift forces. See U.S. Pat. Nos. 5,316,592; 5,505,788; 5,746,839; 6,061,978; and 6,148,570. Reducing wind uplift forces provides several advantages. First, it reduces the necessary weight per unit area of the array. This reduces or eliminates the need for strengthening the support surface to support the weight of the array, thus making retrofit easier and reducing the cost for both retrofit and new construction. Second, it reduces or eliminates the need for the use of roof membrane- (or other support surface-) penetrating fasteners; this helps to maintain the integrity of the membrane. Third, the cost of transporting and installing the assembly is reduced because of its decreased weight. Fourth, lightweight PV assemblies are easier to install than assemblies that rely on ballast weight to counteract wind uplift forces. Fifth, when designed properly, the assembly can serve as a protective layer over the roof membrane or support surface, shielding from temperature extremes and ultraviolet radiation.

SUMMARY OF THE INVENTION

The invention is directed to a stabilized PV system comprising a support surface and an array of photovoltaic (PV) assemblies mounted to the support surface. Each PV assembly comprises a PV module and a support assembly securing the PV module to a position overlying the support surface. The array of modules is circumscribed by a continuous, belt-like perimeter assembly. Cross strapping, extending above, below or through the array, or some combination of above, below and through the array, secures a first position along the perimeter assembly to at least a second position along the perimeter assembly thereby stabilizing the array against wind uplift forces. The first and second positions may be on opposite sides on the array.

Various features and advantages of the invention will appear from the following description in which the preferred embodiments have been set forth in detail in conjunction with the accompanying drawings.

DESCRIPTION OF THE SPECIFIC EMBODIMENTS

Figure 1:
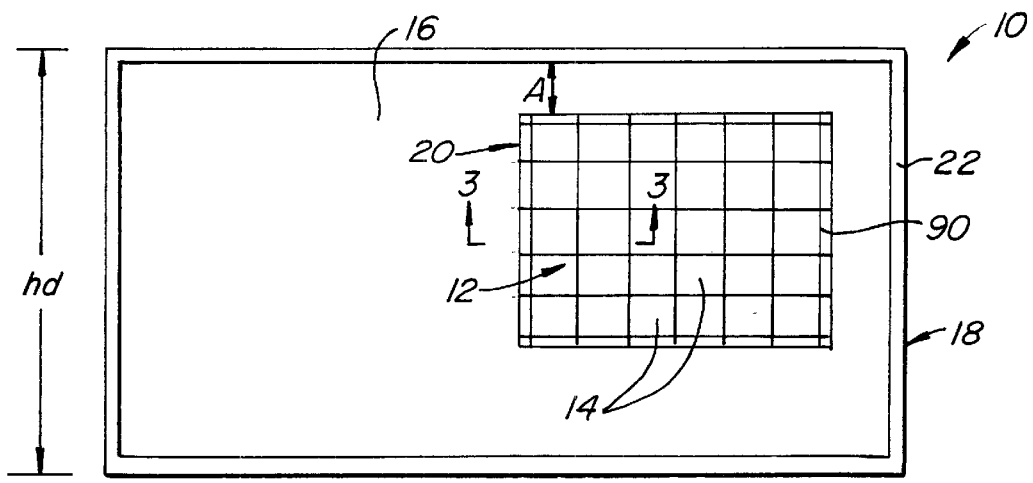
FIG. 1 is a simplified top plan view showing an array of PV assemblies mounted to the horizontal roof of a building.
Figure 2:
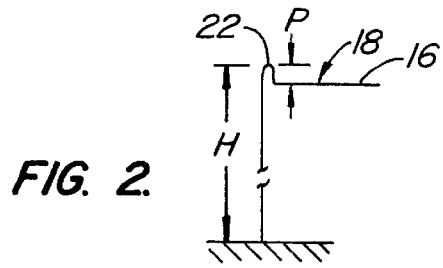
FIG. 2 is a simplified side view illustrating the height of the building of FIG. 1 and the height of a parapet surrounding the roof surface.
Figure 3:
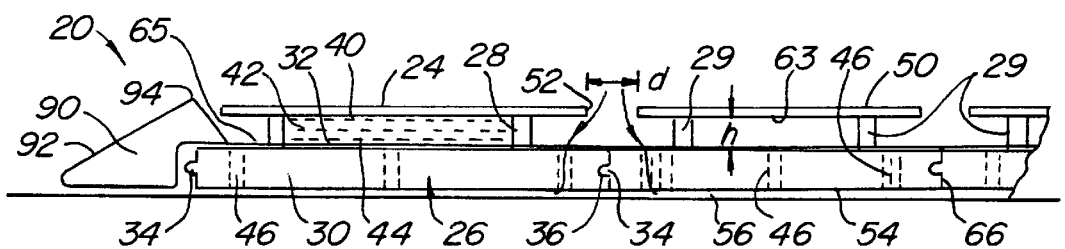
FIG. 3 is a cross-sectional view taken along line 3—3 of FIG. 1 with the bottom surface of the base shown spaced apart from the support surface for purposes of illustration.

FIG. 1 illustrates a PV system 10 comprising an array 12 of PV assemblies 14 mounted to a support surface 16, the support surface being the horizontal roof of a building 18. Array 12 is surrounded by a perimeter assembly 20. As shown in FIG. 2, building 18 has a height H and a parapet 22 with a parapet height P. PV assemblies 14 are interconnected, as shown in FIG. 3, along their abutting edges. This interconnection is important because of the way wind uplift forces act on the array. The magnitude of the wind uplift forces on any particular PV assembly 14 within array 12 changes rapidly over time so that the wind uplift forces on one PV assembly may be much greater or much less than the wind uplift forces on an adjacent PV assembly. Therefore, large uplift forces tending to raise one PV assembly are counteracted because raising the one PV assembly will tend to be resisted by the weight of adjacent PV assemblies.

It has been found through wind tunnel testing that it is possible to determine if array 12 of PV modules 24 is or is not in a desired location on roof 16 of building 18. Wind tunnel testing is carried out using the actual PV modules of interest. The collected data can be provided in chart form suitable for use with various roof locations, typically near an edge (an edge position), near two edges (a corner position) or not near an edge (a middle roof position). For example, assuming a parapet height of 40 cm and a building height of 30 meters, the maximum 3-second wind gust speed for a middle roof position may range from 120–140 mph (depending on the wind direction) while for a corner or edge position the maximum 3-second wind gust speed will be about 100 to 110 mph (depending on the wind direction).

Figure 4:
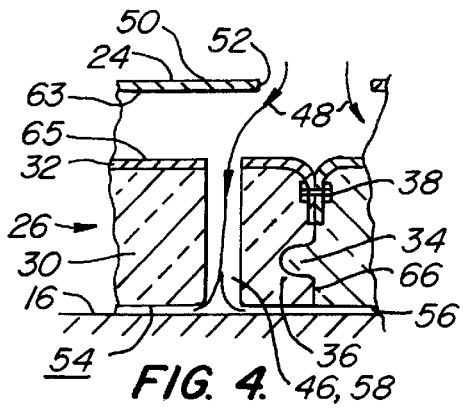
FIG. 4 is enlarged view showing the joint between two PV modules of FIG. 3.

As shown in FIGS. 3 and 4, each PV assembly 14 comprises a PV module 24 supported above a base 26 by a support assembly 28. Support assembly 28 comprises spaced-apart support member 29 adhered, or otherwise fastened, to PV module 24 and to base 26. Base 26 comprises a main body 30, which may be made of thermally insulating foam, such as polystyrene, by DOW Chemical, or Noryl PPO polyphenylene oxide) by GE Plastics, and a base cover 32. Base cover 32 may serve several functions, including adding strength to base 26, protecting main body 30 from degradation due to exposure to sunlight, and also permitting adjacent bases to be securely fastened to one another so to keep them from separating and thus losing the benefits of being interengaged. Base cover 32 may be an electrically conductive sheet metal cover made of polyvinylidene fluoride (PVDF) resin-coated metal. PVDF resin is available from ATOFINA Chemicals, Inc of Philadelphia, Pa. as KYNAR® polyvinylidene fluoride (PVDF) resin. Alternatively, base cover 32 could be made of, for example, galvanized steel, steel, zinc-alum, or aluminum. Cover 32 may have an electrically insulating surface coat of, for example, PVDF resin, Noryl PPO, ASA 606 Acrylic paint by Colloid Research, Inc., or ceramic filled resin coatings by ICS Technologies or EP21LV epoxy by Master Bond Inc. Alternatively, cover 32 may be electrically non-conducting, such as Noryl PPO, ASA 606 Acrylic paint, ceramic filled resin, or other nonconducting material. The interengagement of adjacent PV assemblies 14 is through the use of tongue and groove interengagement elements 34, 36 formed in main body 30 of each base 26 and, alternatively, or in addition, by mechanically fastening covers 32 to one another using fasteners 38. One or more radiant barriers 40, 42, 44, shown in dashed lines in FIG. 3, may be used between or against PV module 24 and base 26. The use of radiant barriers, typically low emissivity (dow-e) films, is described in more detail in U.S. Pat. No. 6,061,978. The use of thermal insulation in conjunction with PV modules is described in the following U.S. Pat. Nos. 5,316,592; 5,505,788; 5,746,839; and 6,148,570.

Figure 6:
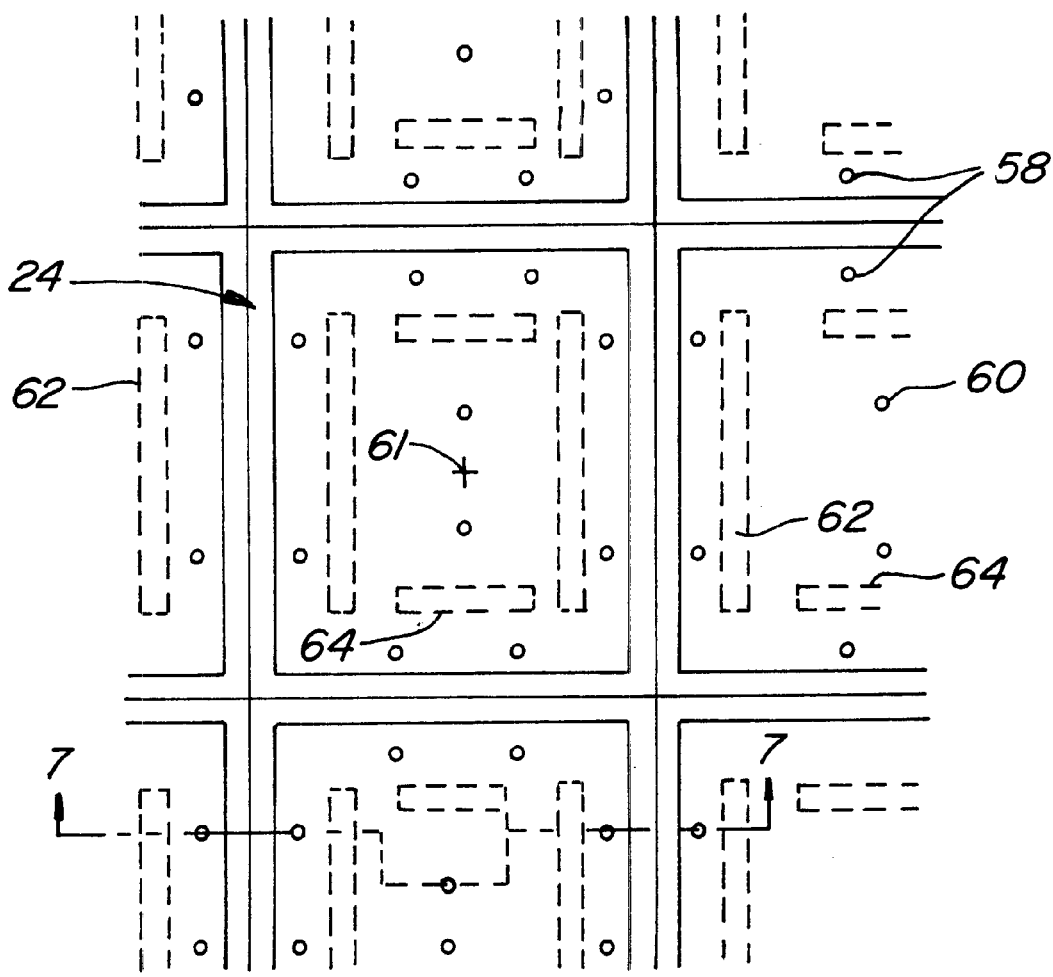
FIG. 6 is a top plan view of a portion of the array of PV assemblies of FIG. 1 illustrating the location of vents, formed through the base, and support assemblies, supporting the PV module above the base.
Figure 7:
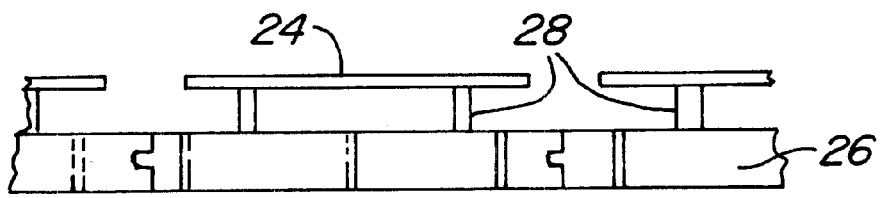
FIG. 7 is a simplified cross-sectional view taken along line 7—7 of FIG. 6.

A number of vents 46 are formed in base 26 to provide pressure equalization paths 48 extending from the outer surface 50 of PV module 24, past the peripheral edge 52 of the PV module, to and through vents 46, and to the lower surface 54 of base 26. In FIGS. 3 and 4 there is an exaggerated gap 56 shown between the lower surface 54 of base 26 and support surface 16. Thus, when wind is moving over array 12 and creates one or more low pressure regions above the one or more PV assemblies 14, the differential pressure between outer surface 50 of PV module 24 and lower surface 54 of base 26 can be at least partially equalized by the passage of air along paths 48. The vents 46 include peripheral vents 58, see FIG. 6, that are generally aligned or coincident with peripheral edge 52, and interior vents 60. Peripheral vents 58 are located between support assembly 28 and the outer edge 66 of base 26. Pressure equalization paths 48, passing through peripheral vents 58, are unobstructed from peripheral edge 52 to the vents. The pressure equalization paths extending through interior vents 60 have partially obstructed path portions from peripheral edge 52 to vents 60 due to the locations of the various support elements 62, 64 and the positions of vents 60 between the center 61 of PV module 24 and support elements 62, 64; see FIG. 6.

The inner surface 63 of PV module 24 is separated from the upper surface 65 of base 26 by an average distance of about h. Peripheral edges 52 are separated by an average distance of about d. The d/h ratio is preferably about 0.1 to 6 and more preferably about 0.5 to 3. Distances h and d typically range from about 1.3 cm to 10 cm for h and about 1.3 cm to 7.6 cm for d, but may be greater or lesser than these distances.

There is a trade-off between the size and number of vents and the thermal insulation provided by base 26. Assume peripheral vents 58 for a PV assembly 14 have a total cross-sectional area of V and PV module 24 has a cross-sectional area of P. The percentage of V to P is (1) at least about 0.02 percent and preferably at least about 0.07 percent, and (2) about 0.02 percent to 50 percent, and preferably about 0.05 percent to 5 percent and more preferably about 0.07 percent to 2 percent. Forming vents in this manner aids the ability to use a PV assembly 14 having a weight of about 5–25 kg per square meter while avoiding the need to attach PV assembly 14 to support surface 16. In addition, if the total cross-sectioned area of peripheral vents 58 is w. it is preferred that the percentage of w to P be about 0.1% to 50% and more preferably about 0.4% to 5%. The determination of the percentage of w to P involves balancing the desire to minimize the holes, as They require additional manufacturing steps and degrade the insulating quality of the foam layer, with the desire to maximize the holes to improve resistance to wind uplift So the final decision as to the percentage of w to P will typically result in the determination of the minimum vent area needed to withstand uplift forces with comfortable safety margin.

Figure 5:
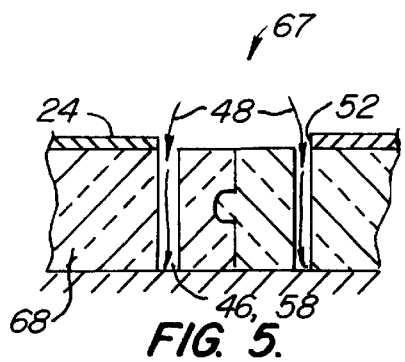
FIG. 5 is an alternative embodiment of the structure shown in FIG. 4.

FIG. 5 illustrates an alternative embodiment of a PV assembly 67 in which PV module 24 is mounted directly onto base 68 using an adhesive as the support assembly; other support structures, such as fasteners or clips, or a combination of support structures, could be used as the support assembly. Base 68 is similar to base 26 but includes no cover 32. Also, base 68 only has peripheral vents 58 which lie generally coincident with peripheral edge 52 of PV module 24.

Figure 8:
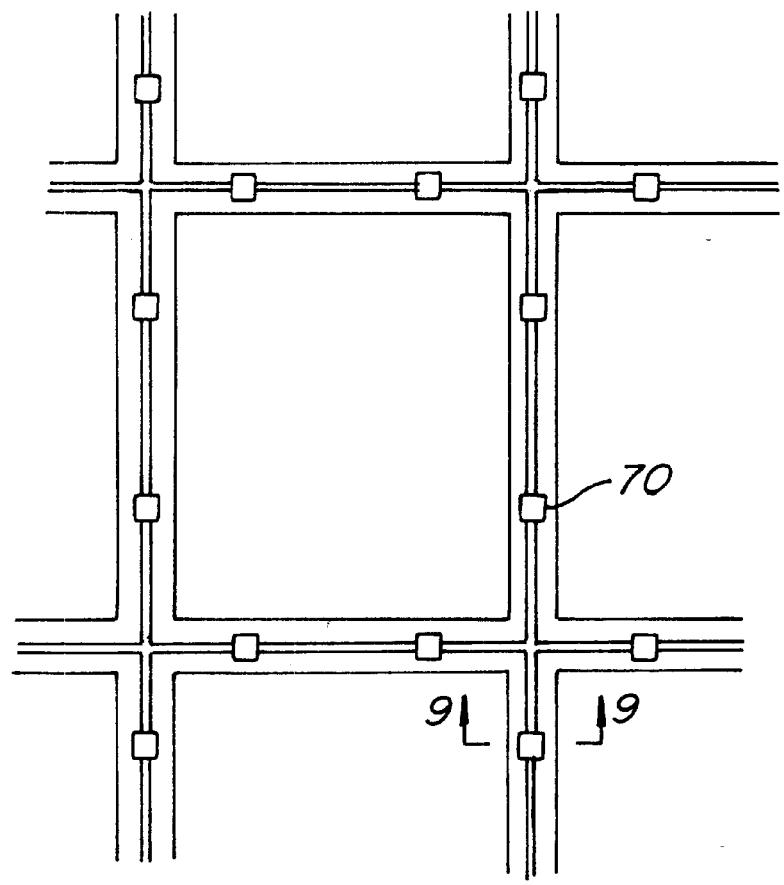
FIG. 8 is a view similar to FIG. 6 illustrating an alternative embodiment of the invention in which vent holes are formed at the joint between adjacent bases.
Figure 9:
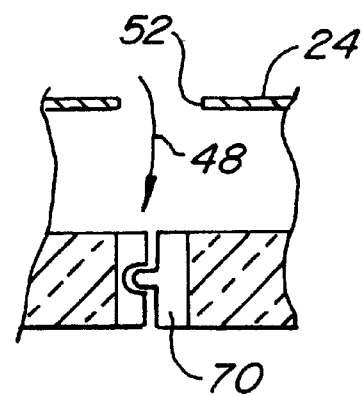
FIG. 9 is enlarged cross-sectional view taken along line 9—9 of FIG. 8.

FIGS. 8 and 9 illustrate vents 70 formed at the intersecting outer edges 66 of adjacent bases 26. Such vents 70 are also considered to be generally aligned with or coincident with peripheral edge 52 of PV module 24.

Figure 10:
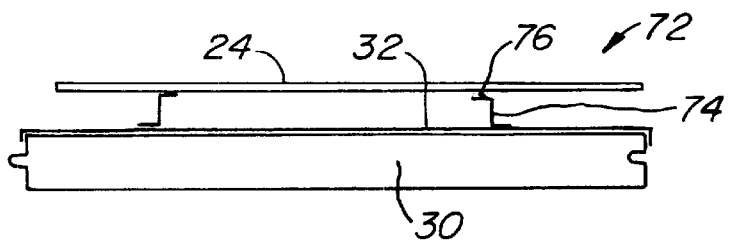
FIG. 10 is a side view of an alternative embodiment of the PV assembly of FIG. 3 showing the use of Z-type support assemblies.
Figure 11:
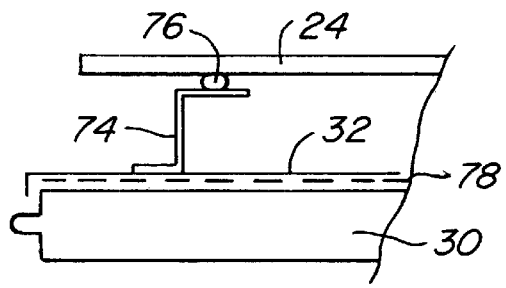
FIG. 11 is enlarged view of a portion of the PV assembly of FIG. 10 showing the use of a low-e film between the base and the PV module.

FIGS. 10 and 11 illustrate a PV assembly 72 using Z-type supports 74 secured to PV module 24 with an adhesive 76. Z-type supports 74 are preferably integral, one-piece extensions of base cover 32. Supports 74 may also be attached to base cover 32. A low emissivity (low-e) film 78 is situated between cover 32 and PV module 24.

Figure 12:
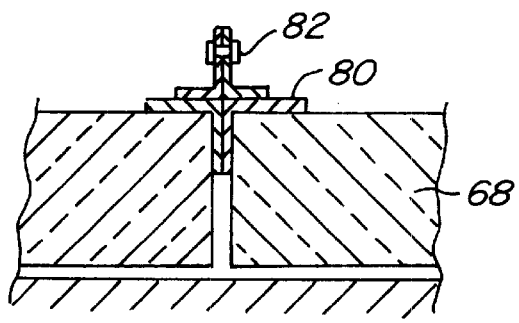
FIG. 12 shows an alternative embodiment of the structure of FIG. 4 in which interengagement of the bases is accomplished by fastening one base to an adjacent base.
Figure 13:
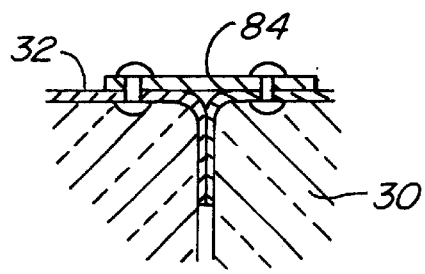
FIG. 13 shows a further alternative embodiment in which electrically conductive covers of adjacent bases are electrically secured to one another through an electrical ground connection which also acts to secure the adjacent PV assemblies to one another.

FIG. 12 illustrates an alternative method of interengaging adjacent bases 68 using fastener brackets 80 mounted to each base with the brackets secured together by a double-headed fastener 82, such as a nut and bolt or rivet. FIG. 13 illustrates another alternative in which base covers 32 are interengaged and electrically connected by an electrical ground connection 84 between adjacent covers. A wide variety of interengagement elements and electrical ground connections, including rigid, flexible and elastic elements, may be used.

Figure 14:
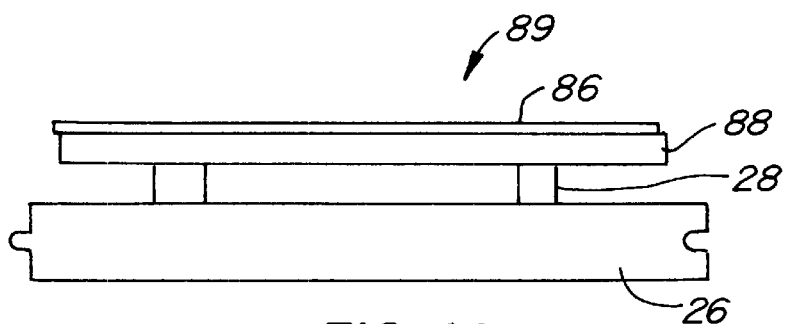
FIG. 14 is a simplified side view of the PV assembly in which the PV module comprises a flexible PV panel mounted to a PV panel stiffener which provides the necessary support of the flexible PV panel.

FIG. 14 illustrates supporting a flexible PV panel 86 with a PV panel stiffener 88 to create a self-supporting, generally rigid PV module 89.

Perimeter assembly 20, see FIGS. 1 and 3, comprises a series of perimeter elements 90. Typically, each perimeter element 90 is the same length as one side of a PV assembly 14. Perimeter elements 90 are preferably secured to one another so that perimeter assembly 28 is a belt-like perimeter assembly. Perimeter assembly 20 serves several functions including (1) maintaining the spatial integrity of array 12 by helping to prevent PV assemblies 14 from shifting or otherwise moving laterally relative to one another, and (2) deflecting air away from the lateral edges of array 12. This latter function is aided by configuring perimeter elements 90 with a sloped outer surface 92 and providing perimeter elements 90 with an upper edge 94 which is about equal in elevation to or above outer surface 50 of PV module 24. Perimeter elements typically weigh about 3–52 kg per linear meter, and more preferably about 18–30 kg per linear meter.

Figure 15:
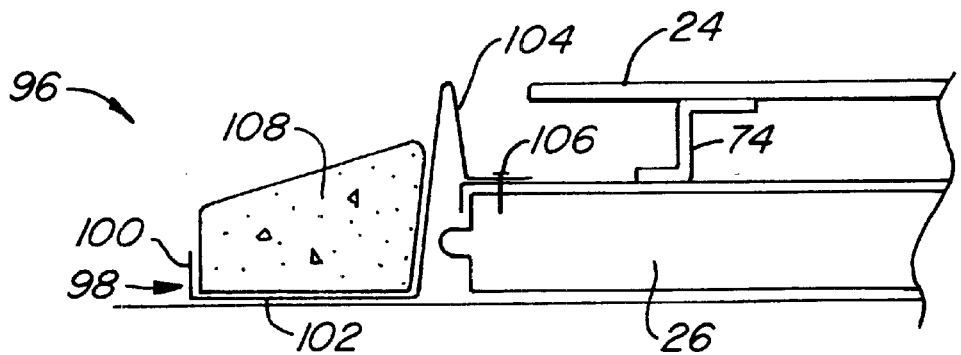
FIG. 15 illustrates an alternative embodiment of the perimeter assembly of FIG. 3 in which a ballast element is housed within a perimeter pan.
Figure 16:
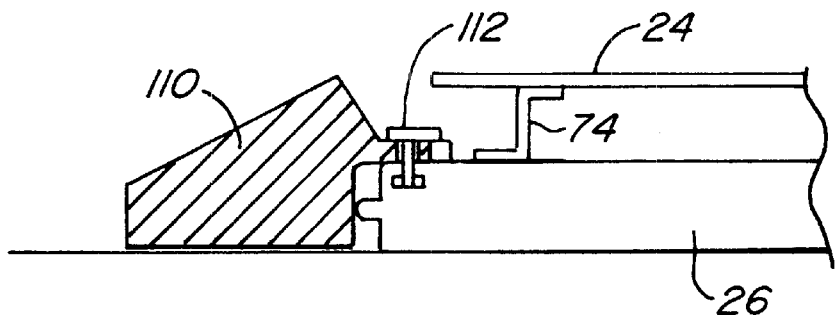
FIG. 16 illustrates a further alternative perimeter assembly using a unitary perimeter element fastened to the adjacent PV assembly.
Figure 17:
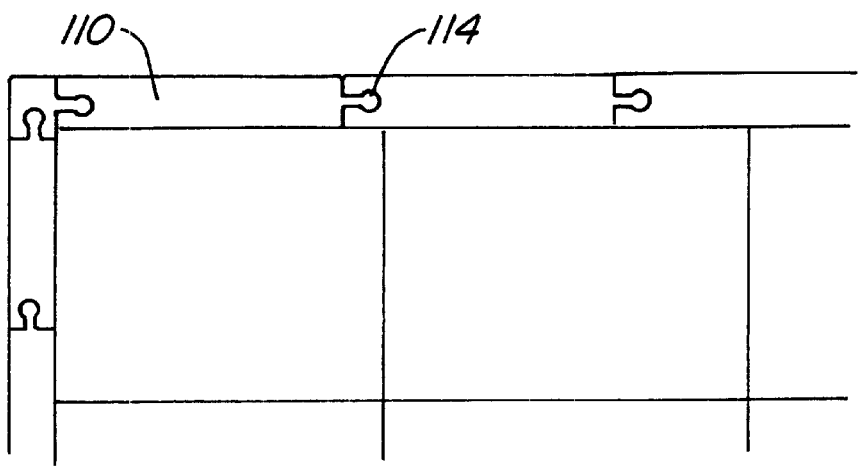
FIG. 17 is a simplified top plan view illustrating the interconnection of perimeter elements circumscribing an array of PV assemblies to create a belt-like perimeter assembly.

FIG. 15 illustrates an alternative perimeter element 96 comprising a perimeter pan 98 having an outer lip 100 which is joined to a base portion 102. A generally v-shaped coupler 104 extends from base portion 102 and may be fastened to base 26 by a fastener 106. Perimeter element 96 also includes a ballast element 108, typically made from concrete, stone or other suitably heavy material. FIG. 16 illustrates a unitary perimeter element 110 which may be fastened to base 26 by a fastener 112. Perimeter element 110 is preferably a molded or cast material, such as concrete, or plastic. As shown in FIG. 17, perimeter elements 110 may be secured together using ball and socket type of engagement members 114.

Figure 18:
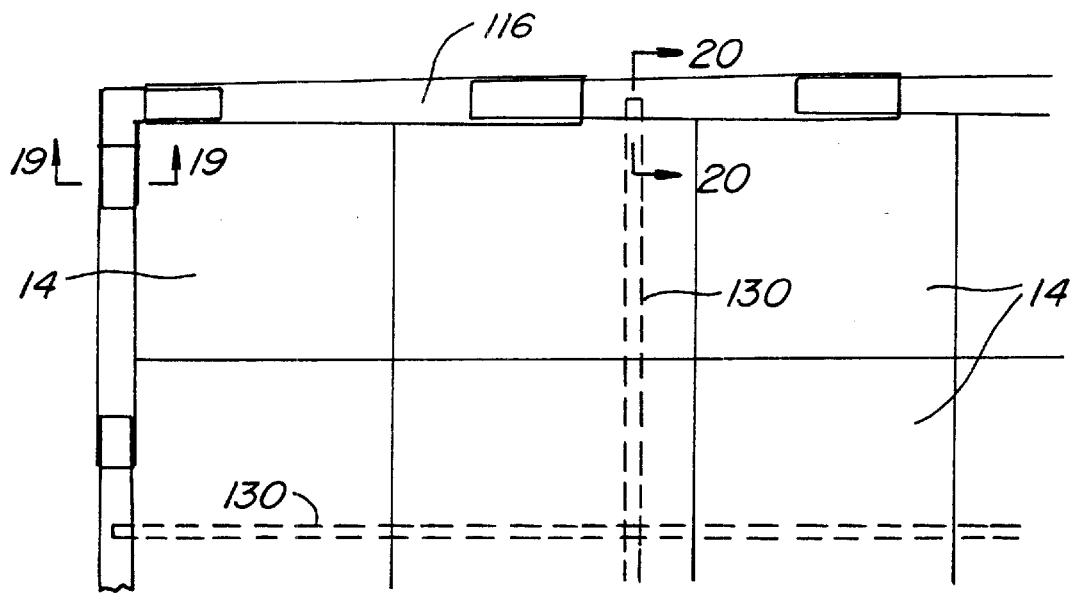
FIG. 18 is a further alternative embodiment of a belt-like perimeter assembly showing the use of cross strapping to secure spaced apart perimeter elements to one another.
Figure 19:
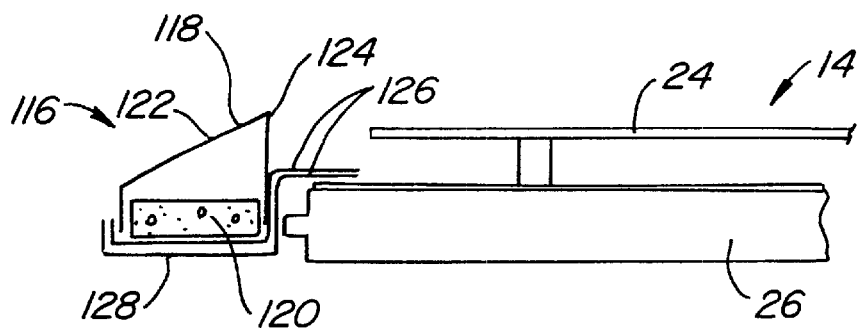
FIG. 19 is a cross-sectional view taken along line 19—19 of FIG. 18 illustrating the overlapping of adjacent perimeter pans.
Figure 20:
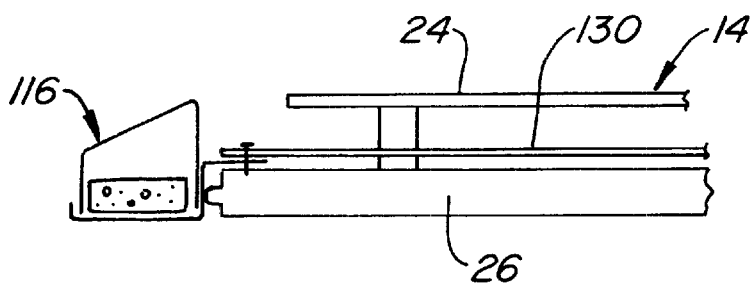
FIG. 20 is a cross-sectional view taken along line 20—20 of FIG. 18 illustrating the connection of the cross strapping to one perimeter element and the passage of the cross strapping between the PV module and the base.

FIGS. 18–20 illustrates a further embodiment of a perimeter assembly using perimeter elements 116 similar to perimeter element 96 with the following differences. A cap 118 is used to cover ballast element 120, the cap defining a sloped outer surface 122 and an upper edge 124 of perimeter element 116. A coupler 126 is a relatively simple L-shaped member and extends from a pan 128. The pans 128 of adjacent perimeter elements 116 overlap, as shown in FIGS. 18 and 19, to help increase the structural rigidity between perimeter elements 116. FIGS. 18 and 20 also illustrate the use of cross strapping 130 between perimeter elements 116 on opposite sides of the array 132 of PV assemblies 14. In this embodiment cross strapping 130 passes between PV module 24 and base 26. It could, however, pass entirely beneath PV assembly 14, entirely above the PV assembly, or combination of above, below and through the PV assembly. Cross strapping 130 helps to maintain the desired shape of perimeter assembly 134 and thus of array 132 of PV assemblies 14. Other cross-strapping arrangements, such as triangular, may also be used.

Figure 21:
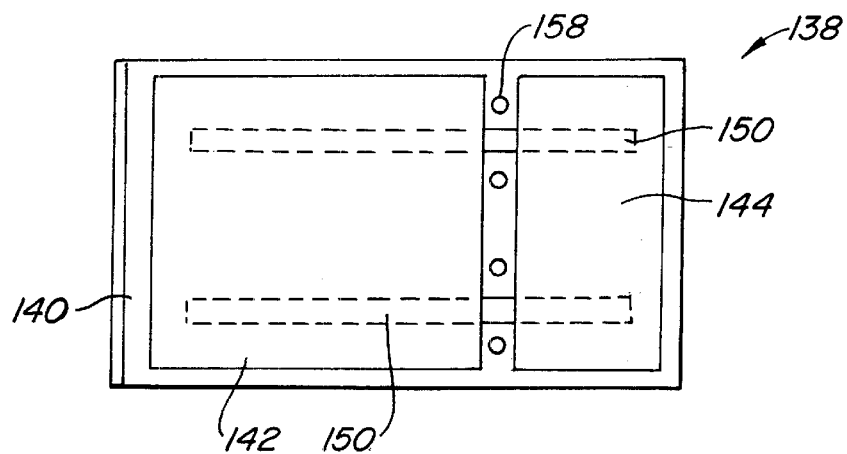
FIG. 21 is a simplified side view of an alternative embodiment of the invention in which the PV module is positioned at an angle to the base, the PV assembly includes an angled deflector, and a gap is defined between the upper edges of the PV module and the deflector.
Figure 22:
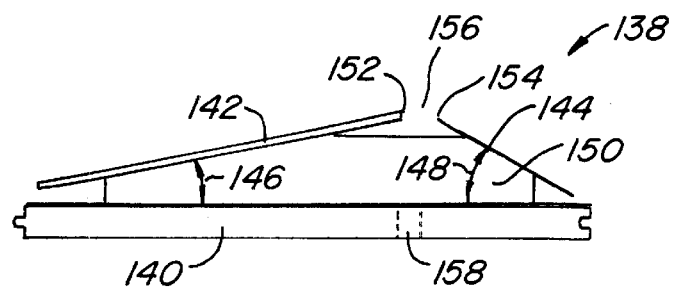
FIG. 22 is a top plan view of the PV assembly of FIG. 21 illustrating the location of the vents formed through the base.

FIGS. 21 and 22 illustrates an inclined PV assembly 138 comprising a base 140, an inclined PV module 142, and an inclined deflector 144; the PV module and deflector are mounted at first and second angles 146, 148 to the base by a pair of dual purpose supports 150. Angle 146 is typically about 5 degrees to 30 degrees while angle 148 is typically about 20 degrees to 70 degrees The opposed upper edges 152, 154 of module 142 and deflector 144 define a gap 156 overlying a set of vets 158 formed in base 140. Gap 156 is typically about 2–8 cm wide. Edges 152, 154 are typically about the same distance above base 140. While it may be desirable to use additional vents through base 140 at different locations, it has been found through wind tunnel testing that positioning vents 158 to be generally aligned with or coincident with gap 156 and providing substantially unobstructed flow paths between the gap and the vents appears to be effective in substantially reducing wind uplift forces on inclined PV assembly 138.

Figure 23:
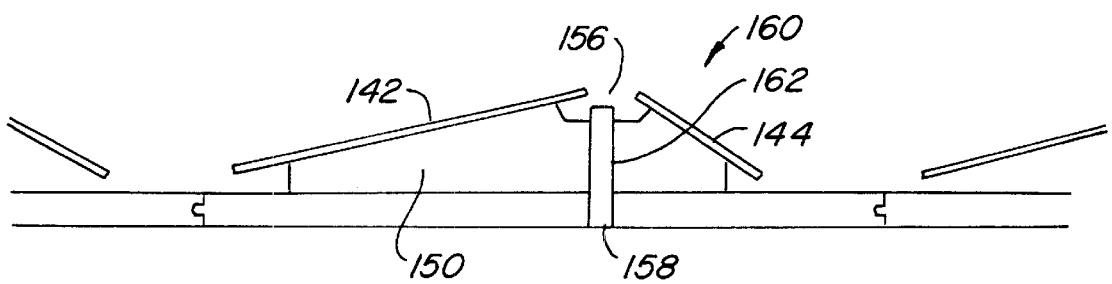
FIG. 23 illustrates an alternative to the PV assembly of FIG. 21 in which vent conduits are used between the vents and the gap.

FIG. 23 illustrates an alternative embodiment to the assembly shown in FIGS. 21 and 22 in which an inclined PV assembly 160 uses hollow conduits 162 to fluidly couple gap 156 and vents 158. An advantage of using hollow conduits 162 by constraining the fluid pathway, more pressure at the top the gap is transferred directly to under the base.

Figure 24:
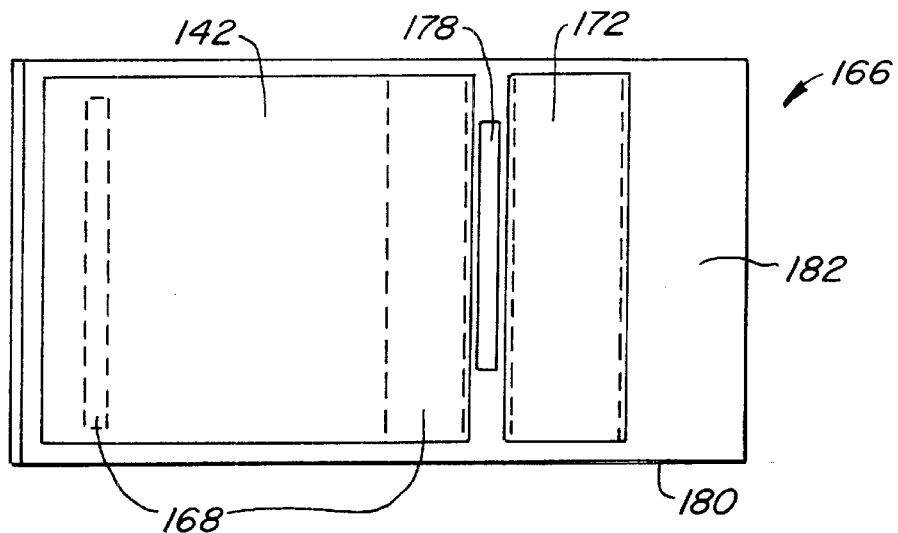
FIGS. 24 and 25 are top plan and side views of an alternative embodiment of the PV assembly of FIGS. 21 and 22 in which the support assemblies for the PV module and deflector help to define a constricted flow path between the gap and the vent.
Figure 25:
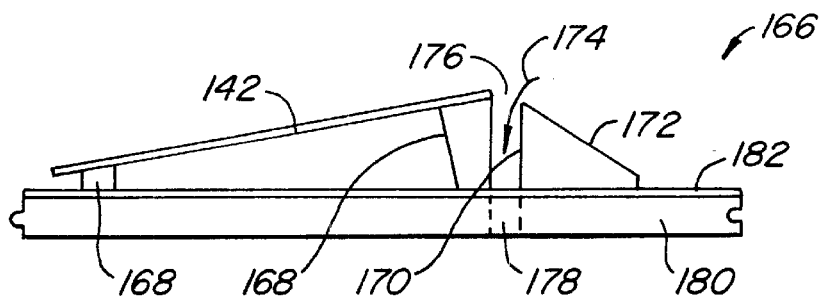

FIGS. 24 and 25 illustrates a further alternative embodiment of an inclined PV assembly 166 in which the support assembly is split up into a PV module support assembly 168 and a deflector support assembly 170. A deflector 172 is formed by the outer surface of deflector support assembly 170. Support assemblies 168, 170 are formed of bent sheet metal and define a constrained flow path 174 between a gap 176 and a single, slot-like vent 178. Base 180 is an extended-width base to provide a walkway 182 adjacent to deflector 172. Within an array, all of the PV assemblies do not need to be designed with an extended-width base to provide a walkway 182.

Figure 26:
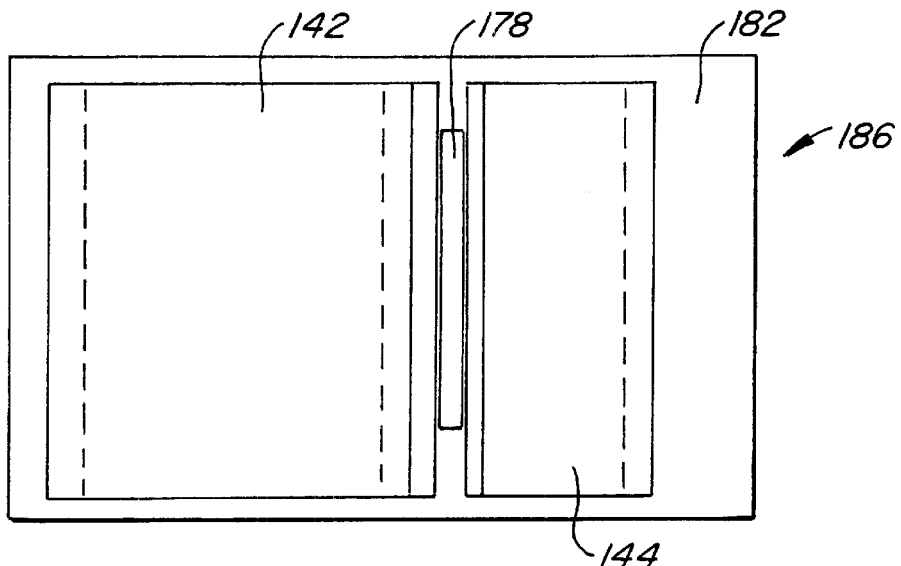
FIGS. 26, 27 and 28 illustrate top, plan and side views of an alternative embodiment of the assembly of FIGS. 24 and 25 in which the support assemblies are multiposition support assemblies which permit positioning the PV module and deflector in the inclined-use configuration of FIG. 27 and the shipping configuration of FIG. 28, FIG. 28 also illustrating use of a shipping block to help support the PV module during shipping and storage.
Figure 27:
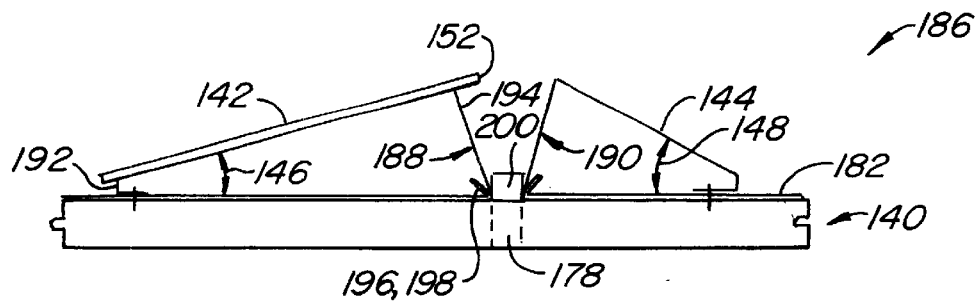
Figure 28:
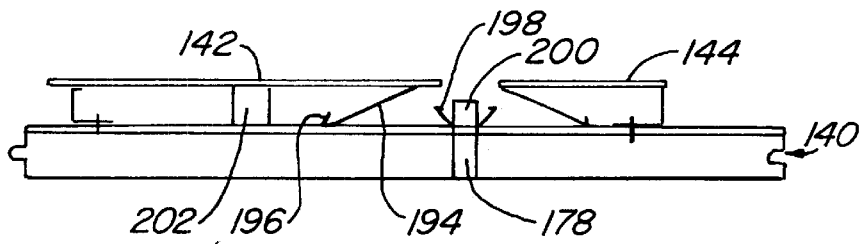

FIGS. 26 and 27 illustrate an inclined PV assembly 186 similar to the embodiment of FIGS. 24 and 25 but using a multiposition PV module support assembly 188 and a multiposition deflector support assembly 190. Support assembly 188 comprises a hinged support 192 at one end of PV module 142 and a strut 194 pivotally mounted near upper edge 152 of module 142. Assembly 188 also includes a clip 196 at the outer end of strut 194 and a complementary clip 198 positioned adjacent to a hollow extension 200 of vent 178 (see FIG. 28). The deflector support assembly 190 includes similar support structure. Clips 196, 198 engage when assembly 186 is in an inclined, in-use configuration of FIG. 27 to maintain the inclined configuration under wind loads. FIG. 28 shows PV module 142 and deflector 144 in a shipping configuration at which PV module 142 and deflector 144 are generally parallel to base 140 so that angles 146, 148 are generally about 0 degrees or about 180 degrees. To aid support of module 142 in the shipping configuration of FIG. 28, a shipping block 202 is positioned between PV module 142 and base 140; a similar support block may be used between deflector 144 and base 140. Other means for stabilizing and supporting PV module 142 and deflector 144 in either or both of the in-use and shipping configurations may be used. Also, strut 194 may be made to be adjustable in length so to vary first angle 146; this may require that deflector support assembly 190 be adjustable so to permit adjustment of the second angle 148.

Figure 29:
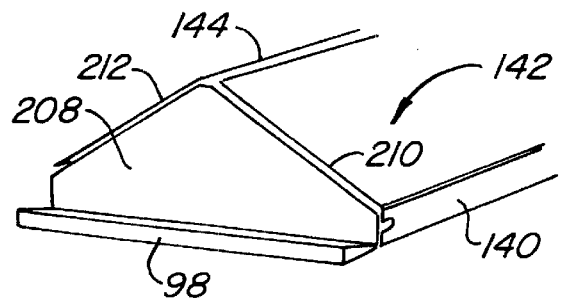
FIG. 29 illustrates a portion of a perimeter element, used with the inclined PV assembly of FIGS. 21 and 22, including an end cap extending upwardly from the pan so to at least substantially cover the triangular opening created by the upwardly extending edges of the PV module and deflector.
Figure 30:
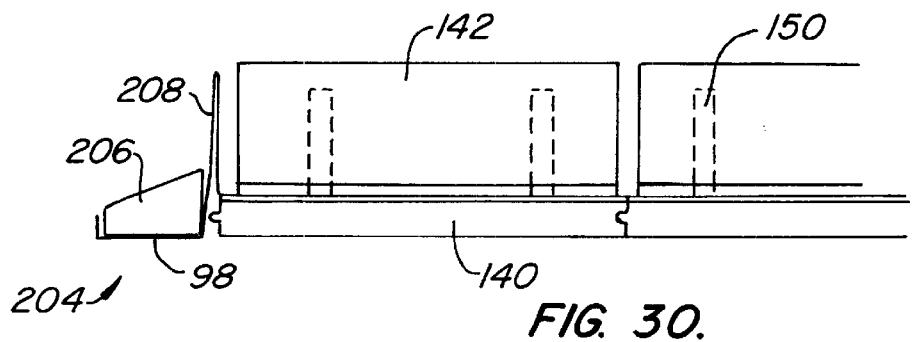
FIG. 30 is a side view of the structure of FIG. 29 including a ballast element housed within the pan.
Figure 31:
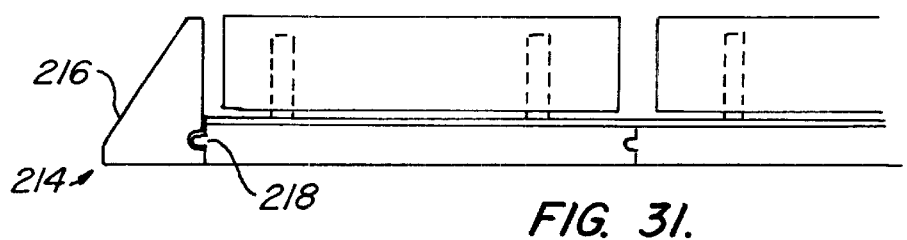
FIG. 31 illustrates an alternative embodiment of the perimeter assembly of FIG. 30.

FIGS. 29 and 30 illustrate the use of an end cap perimeter element 204, similar to perimeter element 96 of FIG. 15, including a ballast element 206. The primary difference is that coupler element 96 is substantially enlarged to create an end cap coupler 208 sized to at least substantially cover the generally triangular opening created by the upwardly extending edges 210 and 212 of PV module 142 and deflector 144. FIG. 31 illustrates a perimeter element 214 similar to the perimeter element of FIGS. 29 and 30. Perimeter element 214 includes a sloped end cap 216, similar to that shown in FIGS. 19 and 20, and a tongue and groove interengagement region 218 for interengagement with base 140. Perimeter elements 204, 214 provide end caps for angled PV assemblies; end caps may also be provided separate from the perimeter elements.

Figure 32:
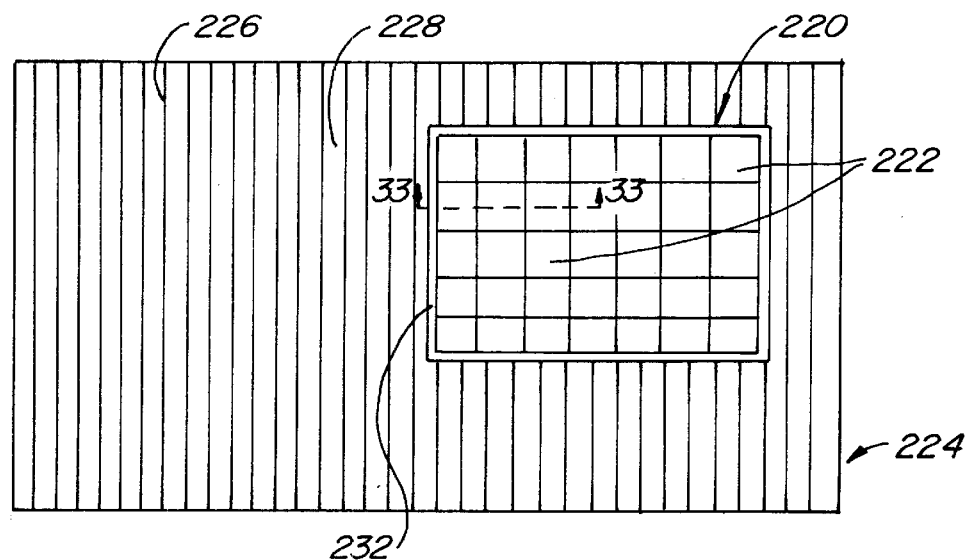
FIG. 32 is a simplified top plan view showing an array of PV assemblies mounted to a support surface comprising alternating ridges and troughs.
Figure 33:
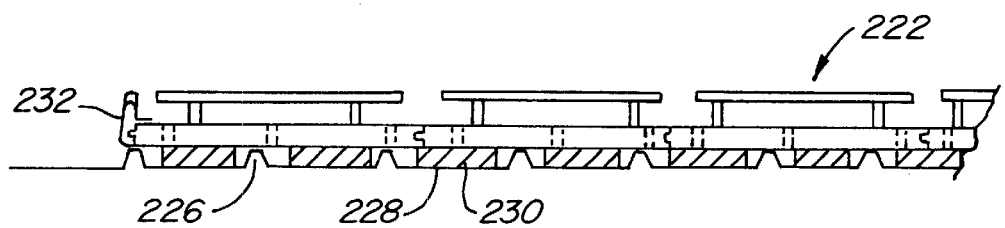
FIG. 33 is a simplified cross-sectional view taken along line 33—33 of FIG. 32 showing the use of blocking within the troughs between the support surface and the bases of the PV assemblies, which blocking may be thermally insulating.
Figure 34:
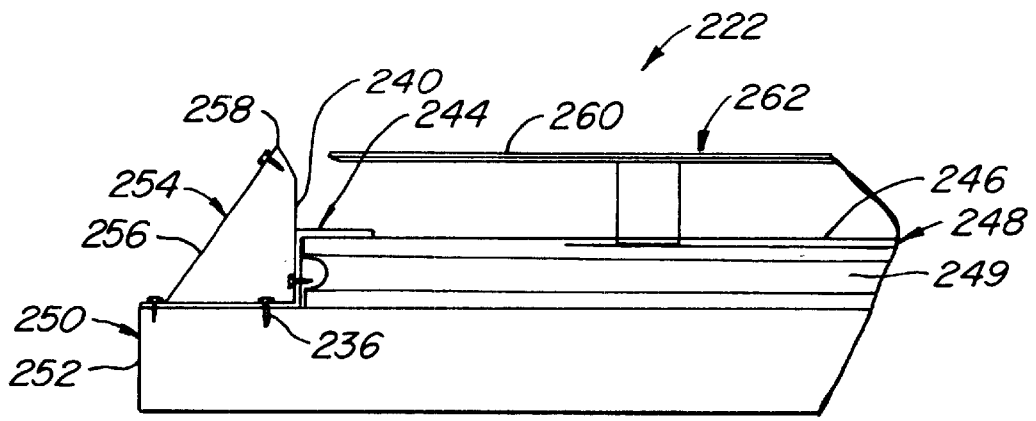
FIG. 34 is a side elevational view showing the details of a perimeter element used with a PV assembly mounted to a corrugated roof.
Figure 35:
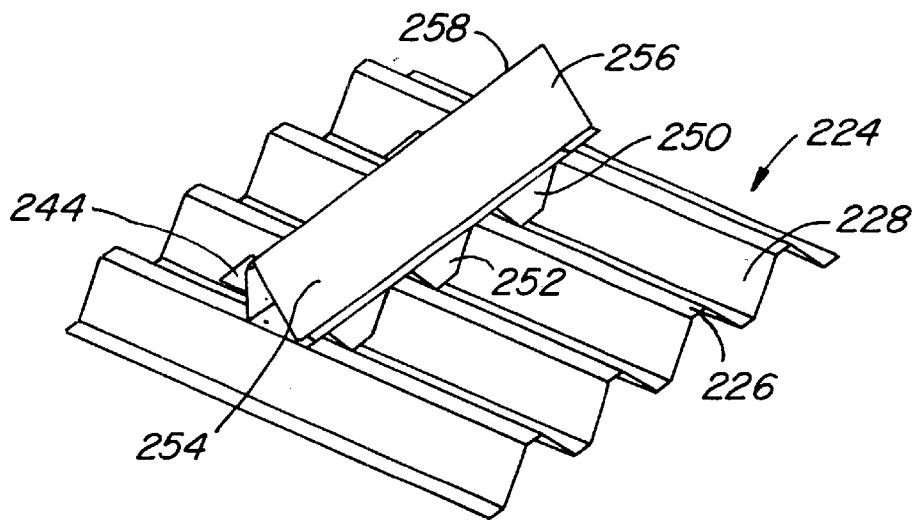
FIG. 35 is an isometric view illustrating a length of the perimeter element of FIG. 34 and showing wind baffles extending into the troughs of the corrugated roof.
Figure 36:
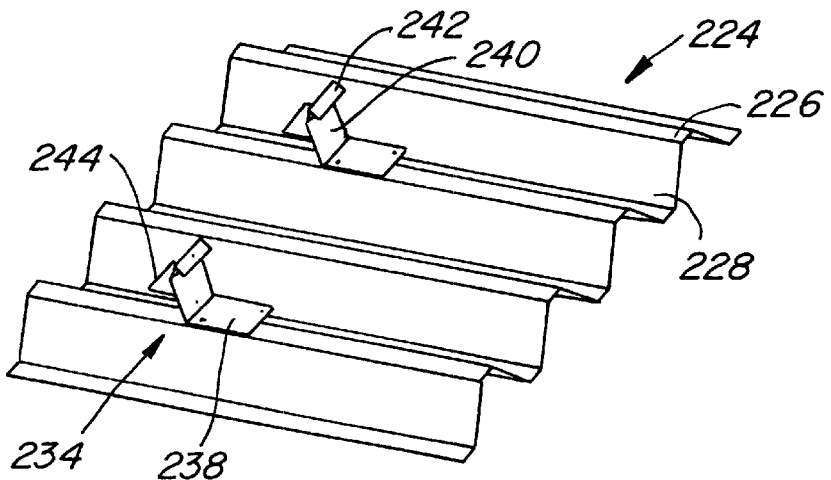
FIG. 36 is similar to FIG. 35 with the curb cover and the wind baffle removed to illustrate the mounting elements.

FIG. 32 is a top plan view illustrating an array 220 of PV assemblies 222. The PV assemblies illustrated are conventional assemblies available from PowerLight Corporation of Berkeley, Calif. as PowerGuard® and are similar to PV assemblies 14 of FIG. 3. Array 220 is supported by a corrugated roof 224, having alternating ridges 226 and troughs 228, and thermally insulating support blocking 230 within troughs 228. Array 220 is surrounded by a perimeter assembly 232, shown in more detail in FIGS. 34–38. Perimeter assembly 232 comprises mounting elements 234 mounted to ridges 226 of roof 224 using conventional corrugated roof fasteners 236 which pass through base 238 of mounting element 234. Mounting element 234 includes an upstanding portion 240 having a support tab 242 at its upper end and a laterally extending securement clip 244 between base 238 and support tab 242. The clip 244 engages the upper surface 246 of the base 248 of PV assembly 222 to help secure PV assembly 222, and thus array 220, to roof 224. Base 248 is of conventional construction with upper surface 246 of a cementitious material covering an expanded polystyrene main body 249.

Figure 37:
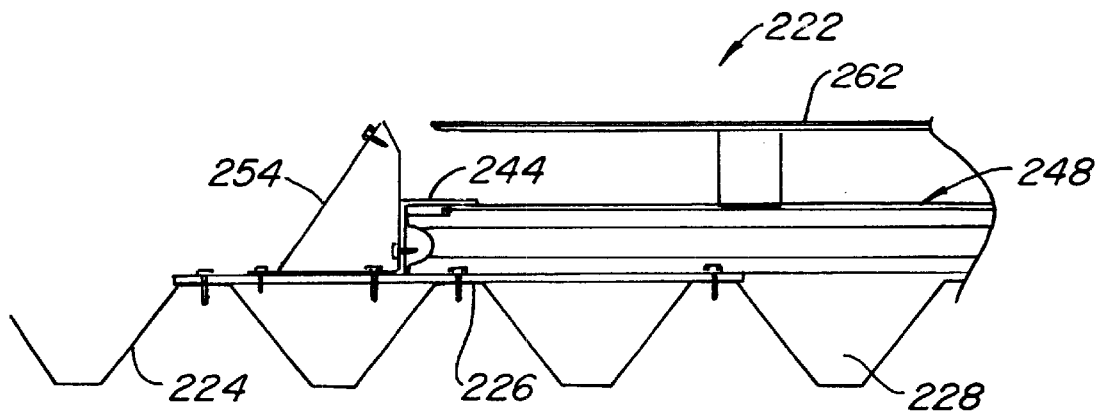
FIGS. 37–39 illustrate structure similar to that of FIGS. 34–36 used when the perimeter assembly runs parallel to the corrugations.
Figure 38:
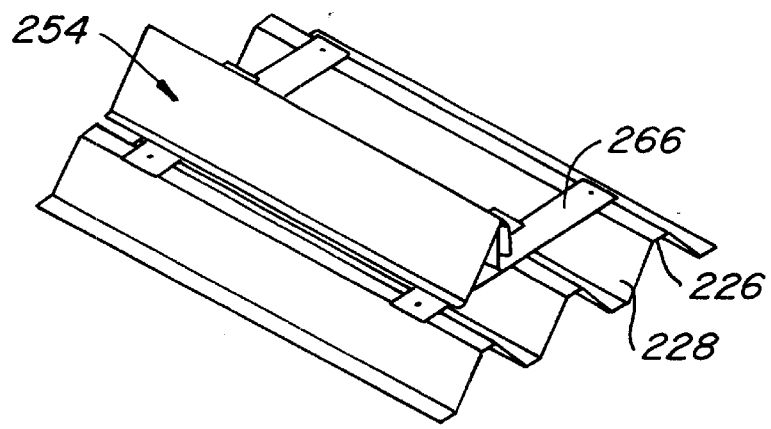
Figure 39:
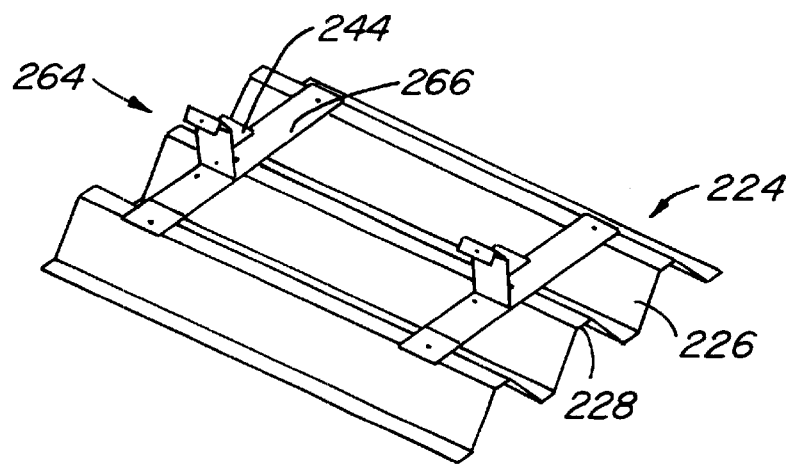

An L-shaped wind baffle member 250 is secured to bases 238 of mounting elements 234 and has a series of downwardly extending wind baffles 252 sized and shaped to fill substantial portions of troughs 228 beneath perimeter assembly 232. Perimeter assembly 232 also includes a cover 254 extending between support tabs 242 and bases 238. Cover 254 has a sloped outer surface 256. Perimeter assembly 232 has an upper edge 258 that is generally even with or vertically above the outer surface 260 of the PV module 262 of PV assembly 222. FIGS. 37–39 show mounting elements 264; mounting elements 264 are modified from mounting elements 234 to accommodate positioning perimeter assembly 232 along the sides of array 220 that run parallel to troughs 228. The main difference is that base 266 of mounting element 264 is much longer and extends to both sides of upstanding portion 240.

Figure 40:
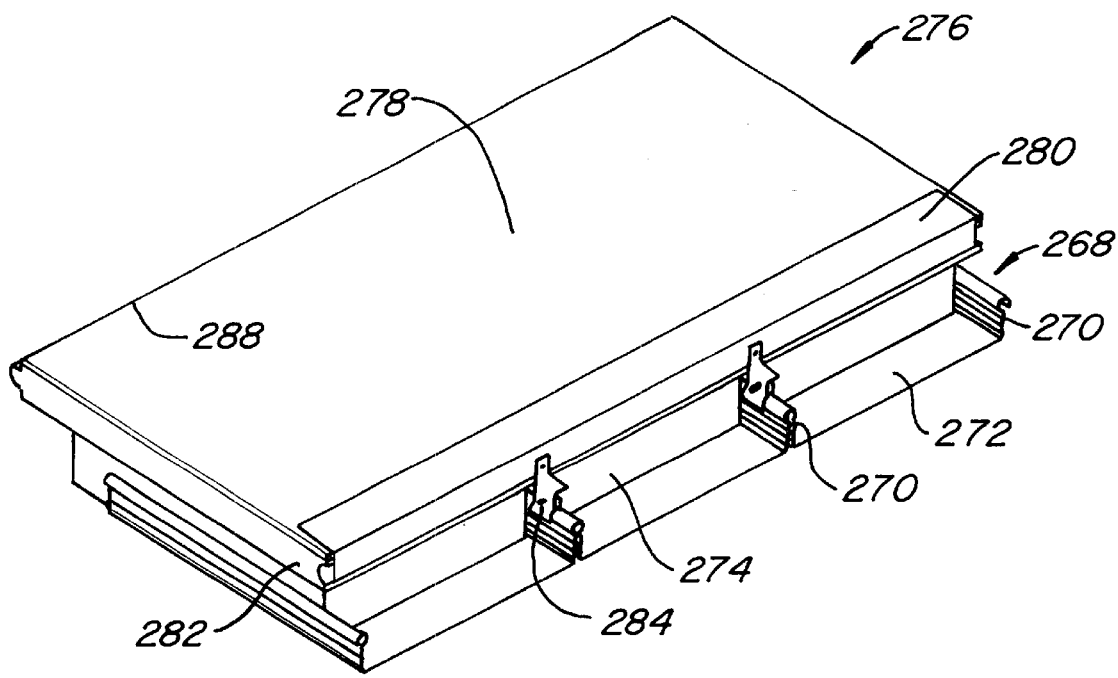
FIG. 40 illustrates the mounting elements of a perimeter assembly used with a standing seam roofing system and showing the use of support foam between the support surface of the roof and the bottom of the base.
Figure 41:
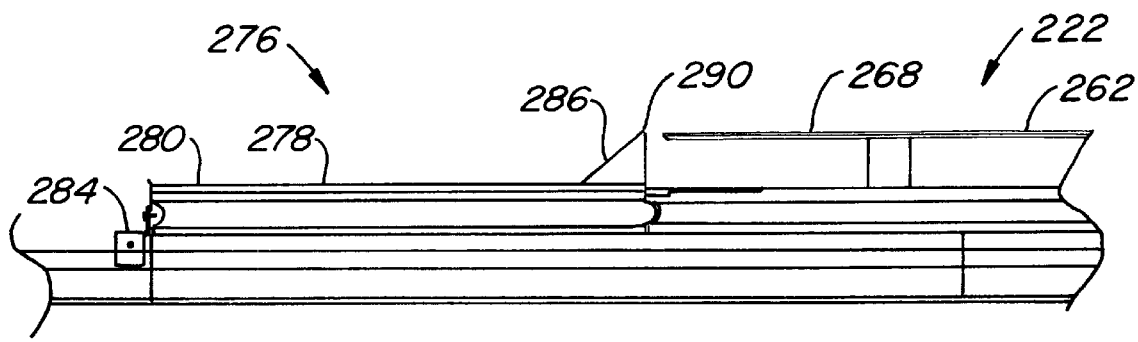
FIG. 41 is a cross-section view of the perimeter assembly of FIG. 40 adjacent a PV assembly.

FIGS. 40 and 41 illustrate a standing seam roofing system 268 having standing seam or ridge portions 270 and pan or trough portions 272. Trough portions 272 are effectively filled with blocks of thermally insulating support foam 274 to both provide thermal insulation for roofing system 268 and support an array of PV assemblies 222 and a walkway-type of perimeter assembly 276. Perimeter assembly 276 includes a paver 278 made similarly to base 248 to provide a walkway around the array of PV assemblies 222. L-shaped flashing 280 engages the outer peripheral edge 282 of paver 278 and is secured to standing seam portions 270 by brackets 284, such as available from Hougovens Aluminum Bausysteme GmbH of Koblenz, Germany as Kal-Zip brackets. A sloped cover 286 is mounted along the edge 288 of paver 278 to lie adjacent to assemblies 222. Sloped cover 286 has an upper edge 290 positioned at least about even with or above outer surface 268 of PV module 262.

The embodiments of the FIGS. 33–41 show the use of insulating foam blocking within the troughs of the building surface. Other types of material, preferably thermally insulating material, can be used, such as polyurethane-based spray foam insulation.

In use, vents are formed through base 26 to create one or more pressure equalization paths 48 extending from outer surface 50 of PV module 24, past peripheral edge 52, to and through at least one of the vents, and to lower surface 54 of the base. At least some of vents 46 may be positioned to be generally aligned or coincident with peripheral edge 52. Pressure equalization path 48 may be created so that the portion of the path extending from peripheral edge 52 to a vent 46 is an unobstructed path portion. See, for example, FIGS. 4, 9, 21 and 24. As shown in FIGS. 21–31, PV module 142 may be oriented at an angle 146 to the base 140 and a deflector 144 may be mounted at an angle 148 to the base, the module and deflector having upper edges 152, 154 defining a gap 156 therebetween. At least one hollow conduit 162 may be used to fluidly couple gap 156 and vent 158. An array of the PV assemblies is mounted to a support surface, typically a horizontal roof; sloped support surfaces may also be used. Mounting typically can be accomplished without the need for fasteners to attach to PV assemblies to the support surface even though the weight of the PV assemblies is in the range of about 10 kg per square meter to 40 kg per square meter and preferably in the range of about 15 kg per square meter to 25 kg per square meter. This is possible, as discussed above, by the of pressure-equalization created through the use of vents and pressure equalization flow paths, and by the use of a perimeter assembly to help maintain the interengagement of the PV assemblies and help deflect wind away from the edges of the array. If desired, support surface-penetrating fasteners or adhesives, or a combination thereof, may be used.

The mounting procedure varies somewhat when an array of PV assemblies is mounted to a support surface comprising alternating ridges and troughs. The troughs beneath the perimeter of the array of PV assemblies will typically be filled with wind deflectors. Thermal insulation is preferably placed in the troughs beneath the array for thermal insulation and to help support the array; however, the location of the thermal insulation may be limited to the perimeter portions of the array, such as the first meter in from all edges. At least one of the vents may be positioned at a location between the center of the PV module and the support assembly for each of a plurality of the PV modules.

Modification and variation can be made to the disclosed embodiments without departing from the subject of the invention as defined in the following claims.

Any and all patents, applications, and printed publications referred to above are incorporated by reference.

What is claimed is:

1. A stabilized PV system comprising:
    a support surface;
    an array of photovoltaic (PV) assemblies mounted to the support surface, the array having first and second sides on opposite sides of the array, each said PV assembly comprising:
        a PV module having an inner surface, an outer surface and a peripheral edge; and
        a support system supporting the PV module on the support surface; said array of PV assemblies being circumscribed by a continuous perimeter assembly; and
    cross-strapping separate from said array and extending at least one of above, below or through the array, securing a first position along tie perimeter assembly to at least a second position along the perimeter assembly thereby stabilizing the array against wind uplift forces.

2. The system according to claim 1 wherein said first and second positions are on opposite sides of said array.

3. The system according to claim 1 wherein each said support system comprises: a base having an upper surface and a lower surface supportable on the support surface; and a support assembly securing the PV module at a position overlying the upper surface of the base.

4. The system according to claim 1 wherein the perimeter assembly comprises perimeter elements which engage one another.

5. The system according to claim 4 wherein said perimeter elements are secured to one another.

6. The system according to claim 1 wherein the perimeter assembly is fastened to the PV modules.

7. A stabilized PV system comprising:
    a support surface;
    an army of photovoltaic (PV) assemblies mounted to the support surface, the array having first and second sides on opposite sides of the array, each said PV assembly comprising:
        a PV module having an inner surface, an outer surface and a peripheral edge; and
        a support system supporting the PV module on the support surface, each said support system comprising: a base having an upper sure and a lower surface supportable on he support surface; and a support assembly securing the PV module at a position overlying the upper surface of the base;
    said array of PV assemblies being circumscribed by a continuous perimeter assembly fastened to the PV modules, said perimeter assembly comprising perimeter elements secured to one another, and
    cross-strapping, separate from said array and extending at least one of above, below or trough the array, securing a first position along the perimeter assembly to at least a second position along the perimeter assembly thereby stabilizing the array against wind uplift forces.

\* \* \* \* \*

UNITED STATES PATENT AND TRADEMARK OFFICE
CERTIFICATE OF CORRECTION

| | | |
|---|---|---|
| PATENT NO. | : 6,495,750 B1 | Page 1 of 1 |
| APPLICATION NO. | : 09/902464 | |
| DATED | : December 17, 2002 | |
| INVENTOR(S) | : Thomas L. Dinwoodie | |

It is certified that error appears in the above-identified patent and that said Letters Patent is hereby corrected as shown below:

In claim 1, column 10, line 3, delete "tie" and insert -- the --.
In claim 7, column 10, line 22, delete "army" and insert -- array --.
In claim 7, column 10, line 30, delete "sure" and insert -- surface --.

Signed and Sealed this

Thirty-first Day of March, 2009

JOHN DOLL
*Acting Director of the United States Patent and Trademark Office*